US010449977B2

(12) United States Patent
Cottard

(10) Patent No.: US 10,449,977 B2
(45) Date of Patent: Oct. 22, 2019

(54) RAILWAY VEHICLE AND FUNICULAR APPARATUS

(71) Applicant: Agence Nationale Pour La Gestion Des Déchets Radioactifs, Chatenay-Malabry (FR)

(72) Inventor: Guillaume Cottard, Annecy-le-Vieux (FR)

(73) Assignee: Agence Nationale Pour La Gestion Des Déchets Radioactifs, Chatenay-Malabry (FR)

( * ) Notice: Subject to any disclaimer, the term of this patent is extended or adjusted under 35 U.S.C. 154(b) by 238 days.

(21) Appl. No.: 15/508,992

(22) PCT Filed: Sep. 4, 2015

(86) PCT No.: PCT/EP2015/070214
§ 371 (c)(1),
(2) Date: Mar. 6, 2017

(87) PCT Pub. No.: WO2016/034698
PCT Pub. Date: Mar. 10, 2016

(65) Prior Publication Data
US 2017/0274913 A1 Sep. 28, 2017

(30) Foreign Application Priority Data

Sep. 4, 2014 (FR) ...................................... 14 58266
Sep. 4, 2014 (FR) ...................................... 14 58268

(51) Int. Cl.
*B61F 5/02* (2006.01)
*B61B 9/00* (2006.01)
(Continued)

(52) U.S. Cl.
CPC .................. *B61F 5/02* (2013.01); *B61B 9/00* (2013.01); *B61B 12/007* (2013.01);
(Continued)

(58) Field of Classification Search
CPC ... B61B 12/007; B61B 12/022; B61B 12/026; B61B 12/028; B61B 12/105;
(Continued)

(56) References Cited

U.S. PATENT DOCUMENTS 413,158 A * 10/1889 Askew ...................... B61B 9/00
104/235
449,466 A 3/1891 Cutshaw
(Continued)

FOREIGN PATENT DOCUMENTS

CH 415 731 A 6/1966
DE 2407273 B1 7/1975
(Continued)

OTHER PUBLICATIONS

International Search Report and Written Opinion, prepared by the European Patent Office acting as the ISA, for International Application PCT/EP2015/070214 dated Nov. 10, 2015.

*Primary Examiner* — Mark T Le
(74) *Attorney, Agent, or Firm* — McCarter & English, LLP

(57) ABSTRACT

A funicular intended particularly for transporting heavy loads between an upstream station (10) and a downstream station (12), comprises a railway track (14) connecting the upstream station (10) to the downstream station (12) and a vehicle (16) running on the track (14) and drawn by at least one towing cable (30). The vehicle comprises a chassis (50) defining a median longitudinal vertical plane that rests on at least one pendulum running gear, comprising two independent lateral pendulum devices (60) each comprising a secondary pendulum (62) articulated in relation to the chassis (50) and two primary pendulums, each articulated in relation to the secondary pendulum (62). Each lateral pendulum device (60) comprises a plate (64) connected to the chassis (Continued)

(50) via one or several jacks (66) to which the secondary pendulum device (62) is articulated.

19 Claims, 8 Drawing Sheets

(51) Int. Cl.
| | | |
|---|---|---|
| *B61D 3/16* | (2006.01) | |
| *B61B 12/00* | (2006.01) | |
| *B61B 12/02* | (2006.01) | |
| *B61B 12/12* | (2006.01) | |
| *B61B 15/00* | (2006.01) | |
| *B65G 23/38* | (2006.01) | |
| *B61F 3/10* | (2006.01) | |
| *B61B 12/10* | (2006.01) | |

(52) U.S. Cl.
CPC .......... *B61B 12/022* (2013.01); *B61B 12/122* (2013.01); *B61B 15/00* (2013.01); *B61D 3/166* (2013.01); *B61F 3/10* (2013.01); *B65G 23/38* (2013.01); *B61B 12/026* (2013.01); *B61B 12/028* (2013.01); *B61B 12/105* (2013.01)

(58) Field of Classification Search
CPC ......... B61B 12/122; B61B 15/00; B61B 9/00; B61B 12/10; B61B 7/045; B61B 12/125; B61B 7/04; B61D 3/166; B61F 3/10; B61F 5/02; B65G 23/38; B66D 1/50
USPC .......... 114/112, 113, 117.1, 173.1, 174, 175, 114/176; 212/198, 316, 321, 312, 322, 212/324; 105/163.1, 163.2
See application file for complete search history.

(56) References Cited

U.S. PATENT DOCUMENTS

| | | | |
|---|---|---|---|
| 767,837 A | | 8/1904 | Sanders |
| 1,412,575 A | | 4/1922 | Sessoms |
| 2,523,113 A | | 9/1950 | Hanna et al. |
| 3,747,718 A | | 7/1973 | Gauchet |
| 3,789,774 A | | 2/1974 | Wilk |
| 3,827,373 A | | 8/1974 | Mouneydiere |
| 3,877,391 A | * | 4/1975 | Gimperlein ............... B66C 7/00 105/163.1 |
| 4,078,500 A | | 3/1978 | Zuppiger |
| 4,693,186 A | | 9/1987 | Lisa |
| 4,785,739 A | * | 11/1988 | Huon de Kermadec .................... B61B 12/06 104/208 |
| 5,626,247 A | | 5/1997 | Hakala et al. |
| 6,170,613 B1 | | 1/2001 | Privé |
| 8,579,261 B1 | * | 11/2013 | Liau ..................... F16C 13/006 254/412 |

FOREIGN PATENT DOCUMENTS

| | | |
|---|---|---|
| DE | 2505561 A1 | 8/1976 |
| EP | 0 692 418 A1 | 1/1996 |
| FR | 699 196 A | 2/1931 |
| FR | 2 109 225 A5 | 5/1972 |
| FR | 2 954 747 A1 | 7/2011 |
| GB | 2 057 991 A | 4/1981 |
| JP | 3-143764 * | 6/1991 |
| JP | H08-133068 A | 5/1996 |
| KR | 20-0382118 Y1 | 4/2005 |
| WO | WO 94/10023 A1 | 5/1994 |
| WO | WO 2011/080423 A1 | 7/2011 |

\* cited by examiner

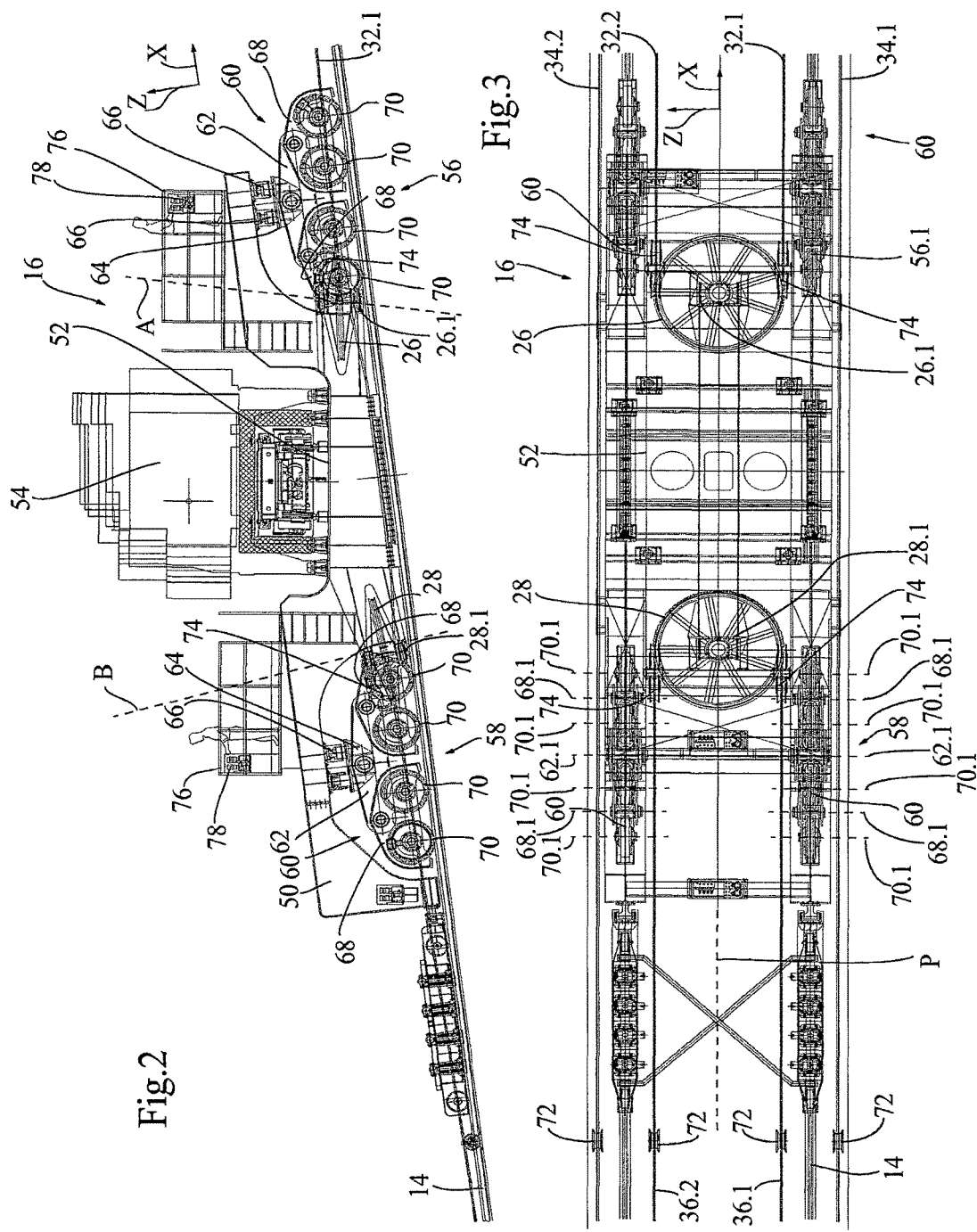

RAILWAY VEHICLE AND FUNICULAR APPARATUS

CROSS-REFERENCE TO RELATED APPLICATIONS

This application in the National Stage entry under 35 U.S.C. § 371 of International Application Number PCT/EP2015/070214 filed on Sep. 4, 2015, published on Mar. 10, 2016 under publication number WO 2016/034698 A1, which claims the benefit of priority under 35 U.S.C. § 119 of French Patent Application Number 1458266 filed Sep. 4, 2014 and French Patent Application Number 1458268 filed Sep. 4, 2014.

TECHNICAL FIELD OF THE INVENTION

The invention relates to a railway vehicle and more specifically a funicular, particularly for transporting heavy loads, such as for example confinement hoods for radioactive wastes intended to be buried in an underground site.

PRIOR ART

Document FR 2 954 747 describes a funicular designed to transport radioactive wastes between an upstream overground station and a downstream station of an underground waste landfill facility. An inclined ramp connects the upstream station to the downstream station and materialises a rail transport track and one or several counterweight tracks. A wagon runs on the transport track whereas one or several counterweights run in the opposite direction on the counterweight track. The wagon and the counterweight(s) are connected by two cables that each pass over a driving pulley, in order to give the installation redundancy with a view to increasing its safety. The metallic chassis of the wagon rests on track rollers, at least four in number and preferably eight. These rollers can be mounted on a rigid primary suspension, for example by means of Belleville washers. In order to take account of any slight variations in the spacing between the rails, the rollers running on one of the rails may be provided with guide flanges, whereas the rollers running on the other rail may be cylindrical. This suspension, although designed to transport heavy loads, is not suitable for the conditions of use and does not guarantee balanced distribution of the load between the rollers.

In document CH415731, a vehicle designed to run on a railway track is described, comprising a chassis defining a median longitudinal vertical plane. The chassis rests on at least one pendulum running gear, comprising two independent lateral pendulum devices situated on either side of the median longitudinal vertical plane. Each lateral pendulum device comprises: a secondary pendulum articulated in relation to the chassis around a horizontal secondary pivot axis and two primary pendulums, wherein each of the two primary pendulums is articulated in relation to the secondary pendulum around a horizontal primary pivot axis, wherein the primary pivot axes of the two primary pendulums are spaced apart from each other, longitudinally on either side of the secondary pivot axis, wherein each primary pendulum is associated with at least two support rollers designed to run on the railway track, each rotating around a rotation axis parallel to the primary pivot axis of the associated primary pendulum and situated longitudinally on either side of the primary pivot axis of the associated primary pendulum. This vehicle is not however suitable for travelling on an inclined track. Moreover, no particular provision is made for loading and unloading the vehicle, nor for its braking.

DISCLOSURE OF THE INVENTION

The invention aims to solve the drawbacks of the prior art and propose a vehicle running on a railway and capable of transporting heavy loads by balancing the load imposed on the railway.

For this purpose, a first aspect of the invention proposes a vehicle designed to run on a railway track and comprising a chassis defining a median longitudinal vertical plane. The chassis rests on at least one pendulum running gear, comprising two independent lateral pendulum devices situated on either side of the median longitudinal vertical plane. Each lateral pendulum device comprises: a secondary pendulum articulated in relation to the chassis around a horizontal secondary pivot axis and two primary pendulums, wherein each of the two primary pendulums is articulated in relation to the secondary pendulum around a horizontal primary pivot axis, wherein the primary pivot axes of the two primary pendulums are spaced apart from each other, longitudinally on either side of the secondary pivot axis, wherein each primary pendulum is associated with at least two support rollers designed to run on the railway track, each rotating around a rotation axis parallel to the primary pivot axis of the associated primary pendulum and situated longitudinally on either side of the primary pivot axis of the associated primary pendulum.

Each lateral pendulum device comprises a plate connected to the chassis via one or several jacks oriented perpendicularly to the secondary pivot axis and around which the secondary pendulum device is articulated. The arrangement of the primary and secondary pendulums of each lateral pendulum device serves to balance the forces exerted on the support rollers and therefore distribute the vehicle weight over a large number of support rollers.

According to a preferred embodiment, the vehicle is designed to run at low speed on a straight railway, the state of which is mastered and controlled. Hence there is no need to allow pivoting of the running gear or the lateral pendulum devices around a rotation axis perpendicular to the track. The secondary pendulums are hinged to the chassis such that the secondary pivot axes of the secondary pendulums are always perpendicular to the median longitudinal vertical plane. Hence there is no rotation of the secondary pendulums around a second axis perpendicular to their second pivot axis. This secondary articulation is therefore a pivoting linkage with one pivot axis only.

Preferably, the primary pendulums are articulated in relation to the secondary pendulums such that for each lateral pendulum device, the primary pivot axes are always parallel to the secondary pivot axis. The articulations are therefore pivoting linkages with a single pivot axis.

Preferably, the jacks are capable of lifting the chassis for setting the vehicle in motion and lowering the chassis for loading or unloading phases or for emergency braking. The vehicle may comprise skids fixed to the chassis, intended to bear against a braking track running alongside the railway track when the chassis is lowered.

According to a particularly advantageous embodiment, for each lateral pendulum device, the plate is connected to the chassis via two jacks, preferably parallel, oriented perpendicularly to the secondary pivot axis, preferably arranged longitudinally on either side of the secondary pivot axis.

According to one embodiment, the vehicle is a funicular comprising a floor defining a horizontal plane and a vertical axis. The jacks are oriented along an axis tilted in relation to the vertical axis and designed to be perpendicular to the track.

According to a particularly advantageous embodiment, the vehicle is a cable-drawn vehicle and comprises at least one first return pulley to guide a towing cable pulling the vehicle in a predetermined first towing direction, wherein the first return pulley has a rotation axis situated in the median longitudinal plane and rotating in a bearing integral with the vehicle chassis, preferably at a distance from and forward of the secondary pivot axes of the secondary pendulums of the first pendulum running gear in the towing direction. This arrangement also helps to ensure correct orientation of the vehicle on the track.

According to a preferred embodiment, the vehicle comprises at least a second return pulley to guide a towing cable (which may or may not be identical to the towing cable passing over the first return pulley), said towing cable pulling the vehicle in a second towing direction opposite to the first towing direction, wherein the second return pulley has a rotation axis situated in the median longitudinal plane and rotating in at least one bearing integral with the vehicle chassis and preferably offset longitudinally in relation to the bearing of the first return pulley in the second towing direction. This arrangement likewise helps to ensure correct orientation of the vehicle on the track.

Preferably, the centre of gravity of the vehicle when empty is situated, in the first towing direction, at a distance from and to the rear of the bearing of the first return pulley, in the median longitudinal plane of the vehicle. This arrangement likewise helps to ensure, on an inclined, straight track, correct orientation of the vehicle on the track.

In practice, the vehicle comprises at least a second pendulum running gear, spaced apart from the first pendulum running gear in a longitudinal direction of the vehicle. The second pendulum running gear is similar to the first pendulum running gear and comprises two independent lateral pendulum devices situated on either side of the median longitudinal vertical plane. Each lateral pendulum device comprises: a secondary pendulum articulated in relation to the chassis around a horizontal secondary pivot axis and two primary pendulums, wherein each of the two primary pendulums is articulated in relation to the secondary pendulum around a horizontal primary pivot axis, wherein the primary pivot axes of the two primary pendulums are spaced apart from each other, longitudinally on either side of the secondary pivot axis, wherein each primary pendulum is associated with at least two support rollers designed to run on the railway track, each rotating around a rotation axis parallel to the primary pivot axis of the associated primary pendulum and situated longitudinally on either side of the primary pivot axis of the associated primary pendulum.

Each lateral pendulum device of the second pendulum running gear preferably comprises a plate connected to the chassis and to which the secondary pendulum of the second pendulum running gear is hinged. For each lateral pendulum device of the second pendulum running gear, the plate is preferably connected to the chassis via one or several jacks oriented perpendicularly to the secondary pivot axis.

The centre of gravity of the vehicle when empty is preferably between the secondary pivot axes of the two pendulum running gears. In the case of a platform for bearing a load, the latter is preferably arranged between the secondary pivot axes of the two pendulum running gears in such a way that the centre of gravity of the vehicle when loaded is likewise situated between the secondary pivot axes of the two running gears.

According to one embodiment, the vehicle is driven by cables and is not motorised. In particular, the support rollers of the first pendulum running gear and of the second pendulum running gear are not motorised.

In the case of a vehicle with two return pulleys and two running gears, the second return pulley is preferably at a distance from and forward of the primary pivot axes of the second pendulum running gear. The axes of the return pulleys are preferably situated between the pivot axes of the secondary pendulums of the first running gear and of the second running gear. The centre of gravity of the vehicle is preferably between the secondary pivot axes of the two pendulum running gears.

According to another aspect of the invention, the latter refers to a funicular comprising an upstream station, a downstream station, a railway track connecting the upstream station to the downstream station and a vehicle as described above, running on the railway track and drawn by at least one towing cable.

According to another aspect of the invention, which is the subject of an international application submitted concomitantly with the present application and to which reference can be made, the latter refers to a funicular comprising an upstream station, a downstream station, a track, preferably a railway, connecting the upstream station to the downstream station, a vehicle running on this track, particularly a vehicle according to the first aspect of the invention, at least one traction cable having a first traction section passing over a first pulley of the upstream station and over a return pulley fixed to the vehicle and a second traction section, in all ways separate from the first traction section and passing over the return pulley and over a second pulley of the upstream station.

More generally, the contents of the former applications, of which the present application claims priority, are entirely incorporated in the present application by reference.

BRIEF DESCRIPTION OF THE FIGURES

Further characteristics and advantages of the invention will be clear from reading the following description, made in reference to the appended figures, which show:

FIG. 2, a side view of a vehicle of a funicular according to a first embodiment of the invention;

FIG. 3, a top view of the vehicle in FIG. 2;

For greater clarity, identical or similar features are identified by identical reference signs in all the figures.

DETAILED DESCRIPTION OF THE EMBODIMENTS

Figure 1:
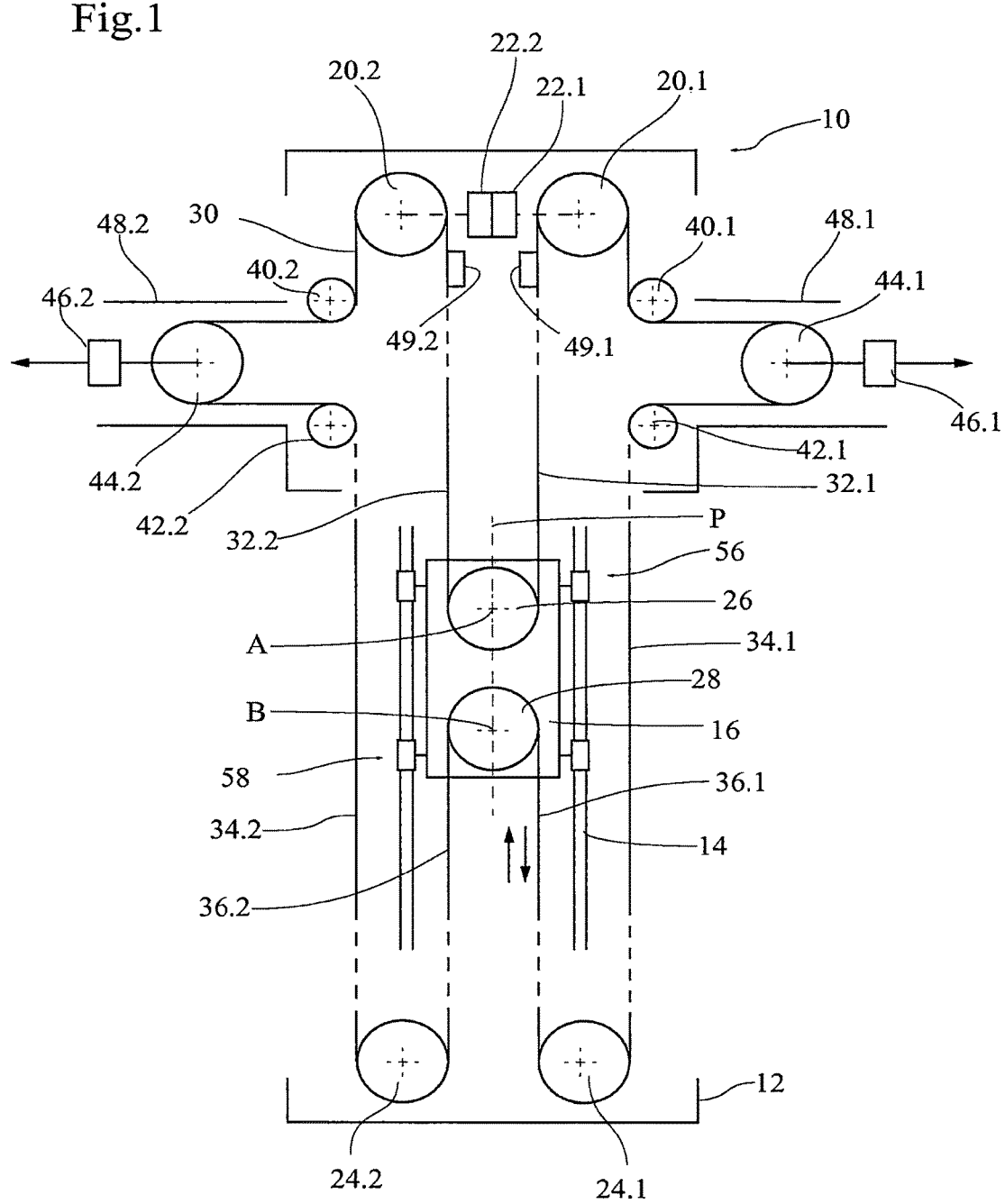
FIG. 1, a diagrammatic view of a funicular according to a first embodiment of the invention.

In FIG. 1, a diagrammatic and simplified illustration is provided of a funicular comprising an upstream station 10, a downstream station 12 and a track 14, preferably a railway, along which a single vehicle 16 travels back and forth, designed to transport a load interchangeably from the upstream station 10 to the downstream station 12 or from the downstream station 12 to the upstream station 10. The track 14 preferably has a constant incline between the upstream station 10 and the downstream station 12.

The upstream station 10 is equipped with two driving pulleys 20.1, 20.2, powered by motor means 22.1, 22.2, which may be common or separate for each pulley.

The downstream station 12 is also equipped with two pulleys 24.1, 24.2, freely rotating, turning around axes parallel to those of the driving pulleys of the upstream station 10.

The vehicle 16 is in turn equipped with two large-diameter return pulleys 26, 28, freely rotating around two axes A, B situated in a median longitudinal median plane P of the vehicle 16. The return pulleys 26, 28 are arranged at a distance from another along the path of the vehicle, one on the side of the upstream station 10 and the other on the side of the downstream station 12.

A closed-loop cable 30 is towed between the return pulleys 26, 28 of the vehicle 16 and the pulleys 20.1, 20.2, 24.1, 24.2 of the upstream and downstream stations. More specifically, the cable 30 comprises a first towing section 32.1 towed between the upstream return pulley 26 of the vehicle 16 and a first pulley (20.1) of those of the upstream station 10, a first linking section 34.1 towed between the first driving pulley 20.1 and a first pulley of those of the downstream station 24.1, a first return section 36.1 towed between the first pulley of the downstream station 24.1 and the downstream return pulley 28 situated on the vehicle 16, a second return section 36.2 towed between the downstream return pulley 28 and the second pulley of the downstream station 24.2, a second linking section 34.2 towed between the second pulley of the downstream station 24.2 situated in the downstream station and the second driving pulley 20.2 of the upstream station 10 and a second towing section 32.2 between the second driving pulley 20.2 and the upstream return pulley 26 of the vehicle 16, thereby closing the loop.

Optionally, each of the two linking sections 34.1, 34.2 passes through a tensioning device 38.1, 38.2 comprising an upstream guide pulley 40.1, 40.2, a downstream guide pulley 42.1, 42.2 and a mobile pulley 44.1, 44.2 bearing a weight 46.1, 46.2 moving in a vertical well 48.1, 48.2. In the diagrammatic representation in 1, the spatial orientations of the pulleys and the path of the cable have not necessarily been respected, but will be more readily apparent from FIGS. 2 to 10.

Provision is also made for cable braking devices 49.1, 49.2, which may for example act on the driving pulleys 20.1, 20.2., or on the towing sections 32.1, 32. of the cable.

The vehicle 16, illustrated in detail in FIGS. 2 to 5, comprises a chassis 50 on which a horizontal platform 52 bearing the load 54 is formed. It is possible to define a longitudinal axis X of the vehicle parallel to the direction of the rectilinear path, a transverse axis Y, perpendicular to the above axis and horizontal and a third reference axis Z of the vehicle, perpendicular to the above axes and the track. The chassis 50 rests on an upstream running gear 56 and a downstream running gear 58. Each running gear is composed of two independent lateral pendulum devices 60. Each lateral pendulum device 60 comprises a secondary pendulum 62 mounted to pivot around an axis 62.1 on a plate 64 fixed to the chassis via two jacks 66 and two primary pendulums 68 articulated in relation to the secondary pendulum 62 around pivot axes 68.1 and on each of which two support rollers 70 are mounted running on the track 14 and rotating around axes 70.1. The jacks 66, which are oriented along axis Z perpendicular to the track 14, do not have a filtering suspension function, but allow raising of the chassis 50 above the ground for its setting in motion and its lowering in contact with the ground of the track 14 when stationary for the loading and unloading phases in the station or when moving for emergency braking. The pivot axes 68.1 of the primary pendulums 68 are arranged longitudinally on either side of the secondary pivot axis 62.1 and the rotation axes 70.1 longitudinally on either side of the primary pivot axis 68.1, which allows balancing of the forces exerted by the support rollers 70 on the track. On one side of the vehicle, the rollers 70 are cylindrical, whereas on the other, they are provided with lateral guide flanges 70.2 to allow compensation for any slight variations in the spacing between the rails. Each roller 70 may also be equipped with a brake 70.3.

Figure 4:
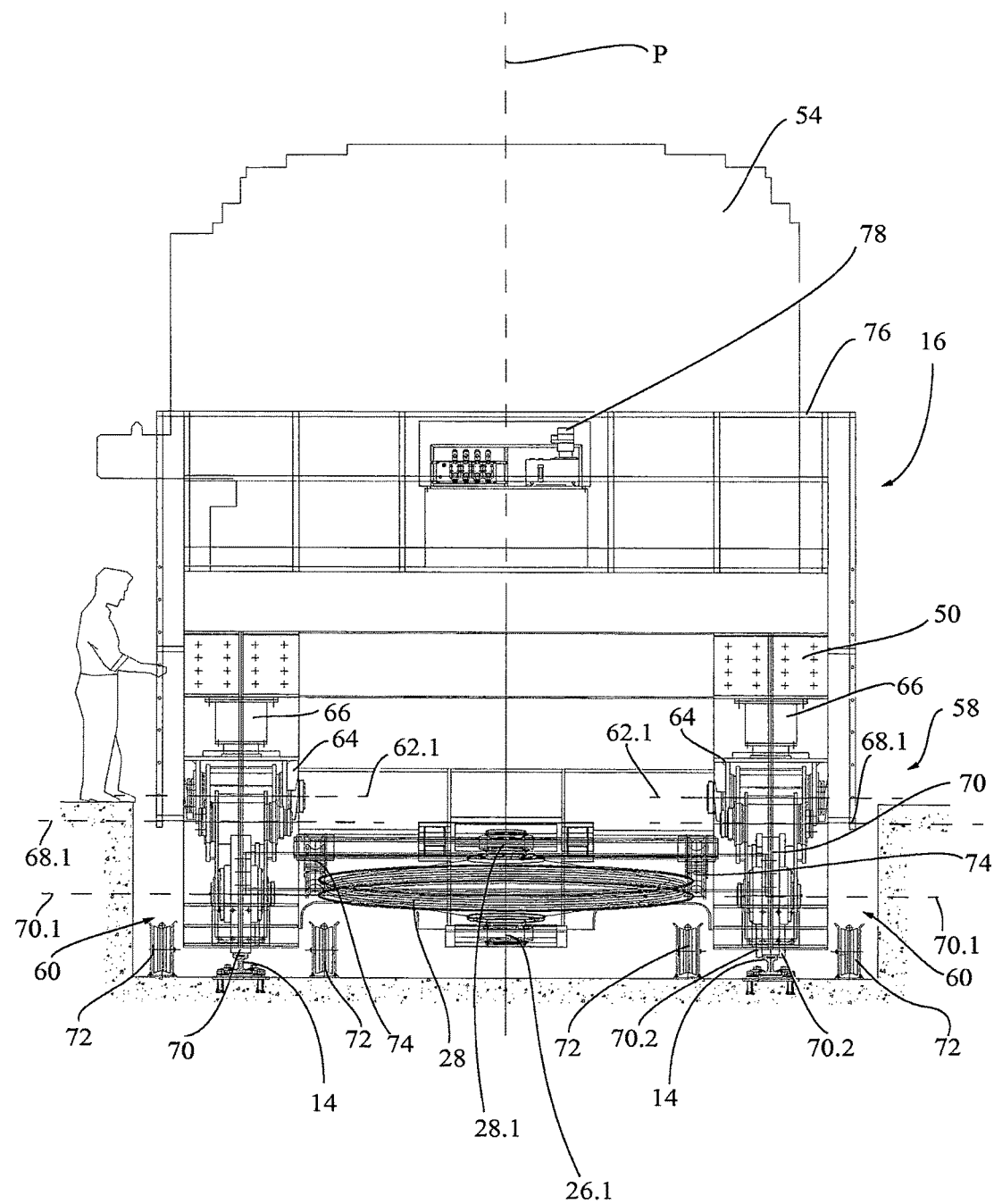
FIG. 4, a front view of the vehicle in FIG. 2.
Figure 5:
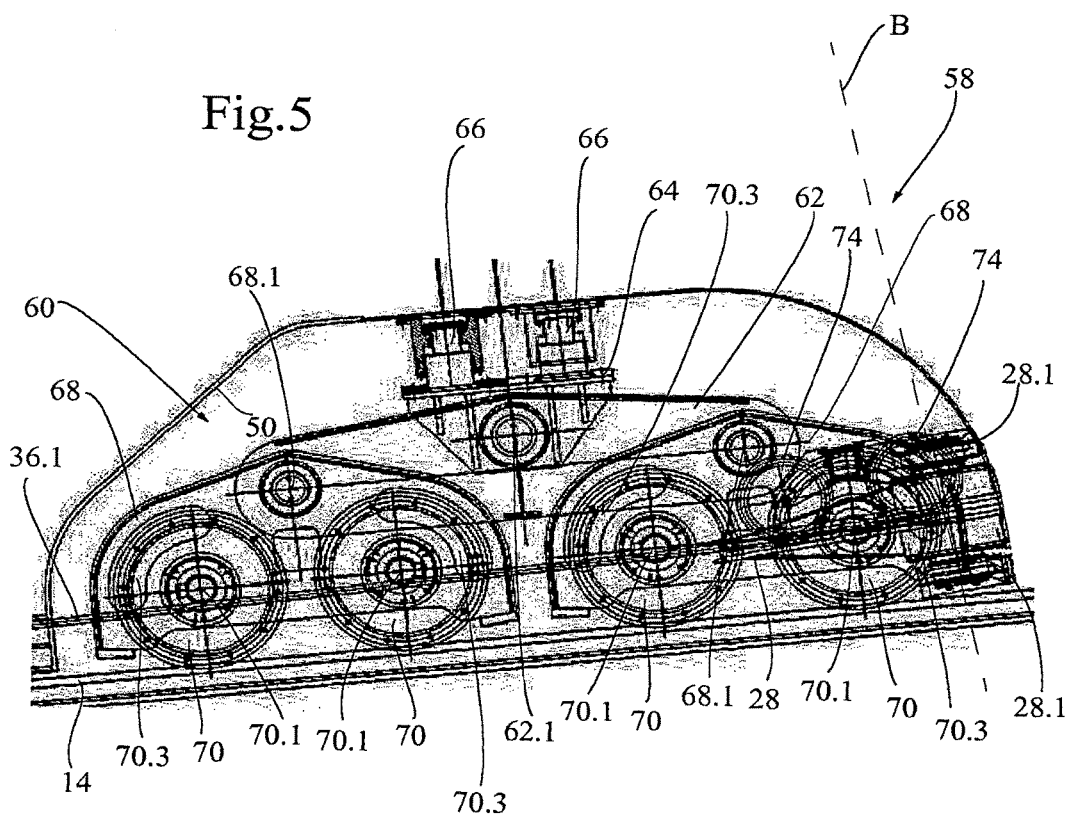
FIG. 5, a detailed view of FIG. 2.

One can see in FIGS. 2 to 4 the positioning of the two large-diameter return pulleys 26, 28, on the chassis, above the track and rotating around two axes A, B situated in the longitudinal median plane and slightly angled in relation to the axis Z perpendicular to the track. The return pulleys are guided in relation to the chassis 50 by bearings 26.1, 28.1. spaced apart from one another along the path of the vehicle. In this case, the bearings 26.1 of the upstream return pulley 26 linking the vehicle to the upstream station, is situated upstream from the bearings 28.1 of the downstream return pulley 28 linking the vehicle to the downstream station 12. Furthermore, the bearings 26.1, 28.1 are situated longitudinally between the secondary pivot axes 62.1 of the upstream running gear 56 and downstream running gear 58. Guide rollers 72 are arranged along the track to support the cable 30. Return pulleys 26, 28 are arranged above the guide rollers 72. The chassis 50 is equipped with orientation rollers 74 allowing the cable 30 to be raised and oriented in the oblique plane of the return pulleys 26, 28.

The vehicle may also be equipped with upstream and downstream driver's cabins 76, each provided with a control console 78. The chassis 50 of the vehicle 16 features wear skids 80 which, when the jacks 66 are lowered, rest on the ground in an area.

Figure 6:
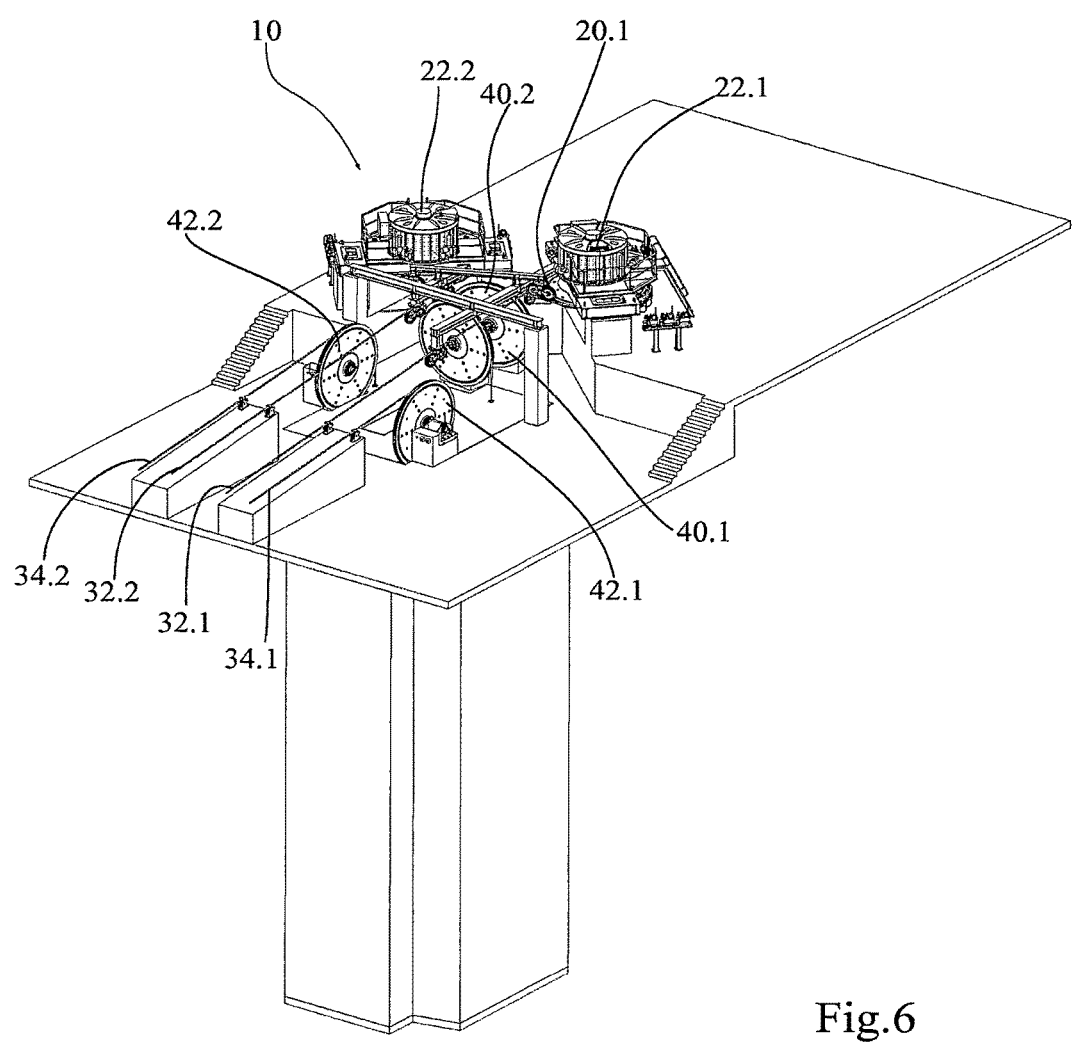
FIG. 6, an isometric view of a part of an upstream station of the funicular in FIG. 1.
Figure 7:
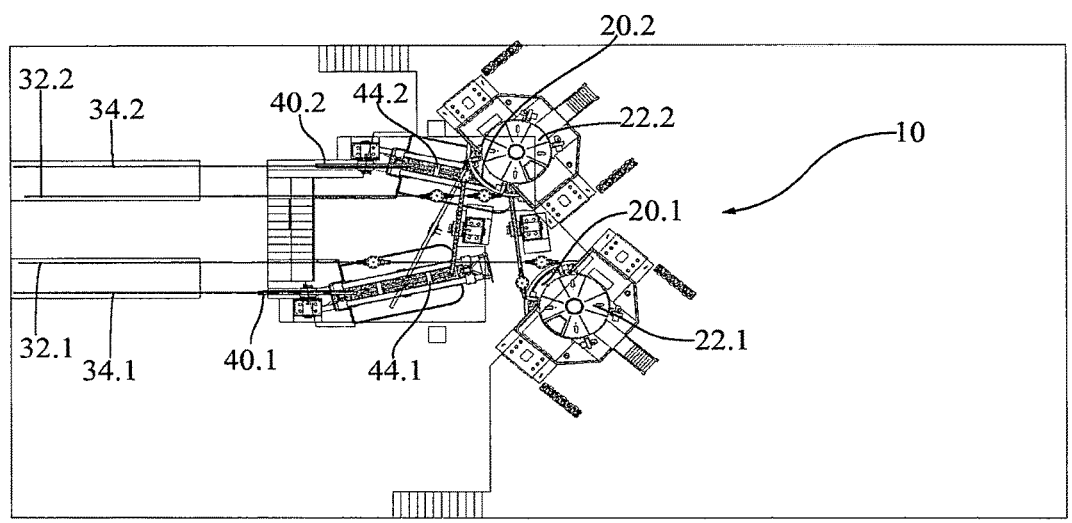
FIG. 7, a top view of the upstream station in FIG. 5.
Figure 8:
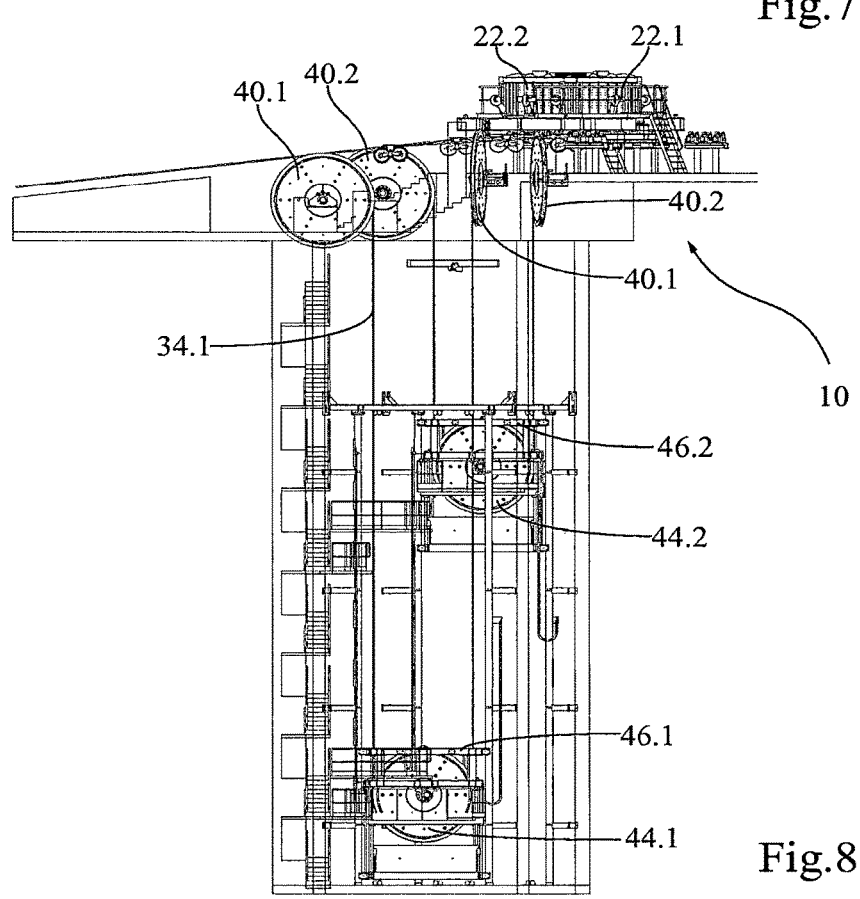
FIG. 8, a side view of the upstream station in FIG. 6.

FIGS. 6 to 8 allow visualisation of the path of the cable in the upstream station. The first towing section 32.1 enters the station along a path situated essentially in a vertical plane parallel to the axis X of the path from the return pulley 26 to the driving pulley 20.1. The same applies to the second towing section 32.2 between the return pulley 26 and the second driving pulley 20.2. On leaving the first driving pulley 20.1, the first linking section 34.1 of the cable crosses the two towing sections 32.1 and 32.2 and is diverted by the upstream guide pulley 40.1 towards the mobile pulley 44.1 in the well 46.1, re-emerging and being guided by the downstream guide pulley 42.1 so as to run along a vertical plane parallel to the path of the vehicle 16, to the downstream station 12. The second linking section 34.2 follows a similar path, crossing the two towing sections 32.1, 32.2 and being diverted by the upstream guide pulley 40.2 towards the mobile pulley 44.2 in the well 46.2, re-emerging and being guided by the downstream guide pulley 42.2 so as to run along a vertical plane parallel to the path of the vehicle 16, to the downstream station 12. Crossing of the linking sections 34.1 34.2 with the towing sections 32.1, 32.2 in the upstream station 10 ensures contact between the cable 30 and each of the driving pulleys 20.1, 20.2 over more than 180° and in practice over more than 225° and preferably over more than 240°. In this embodiment, the upstream driving pulleys, the downstream guide pulleys and the mobile pulleys have horizontal rotation axes, whereas the driving pulleys have vertical axes.

Figure 9:
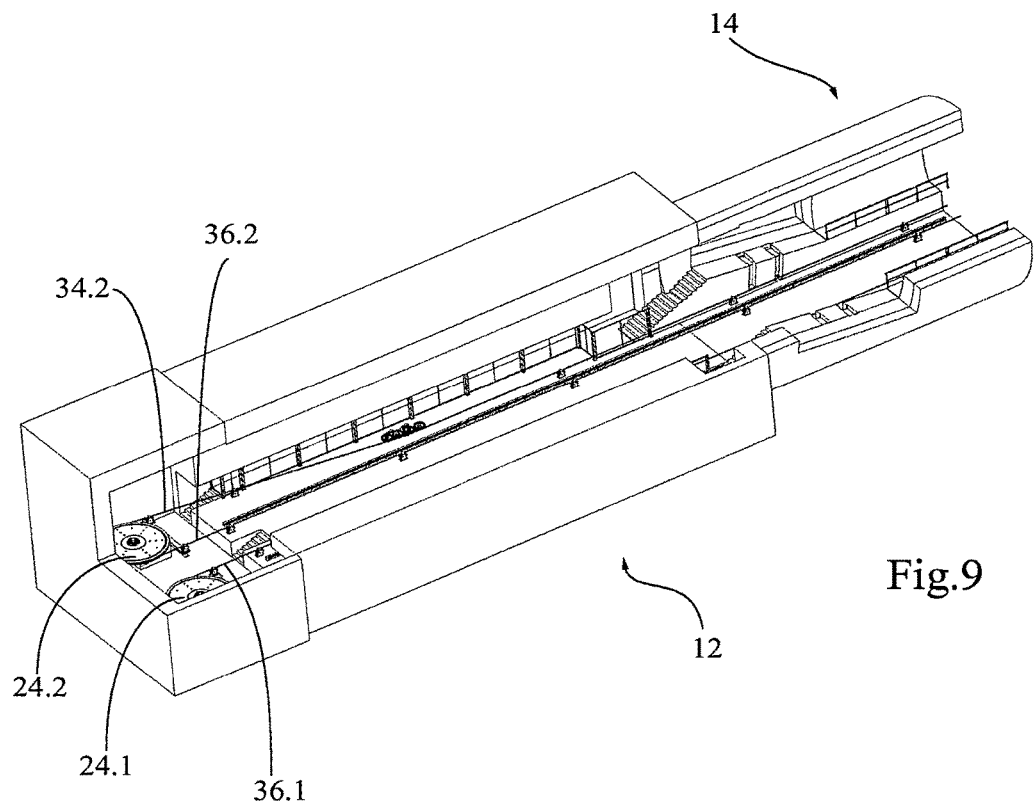
FIG. 9, an isometric view of a downstream station of the funicular in FIG. 1.
Figure 10:
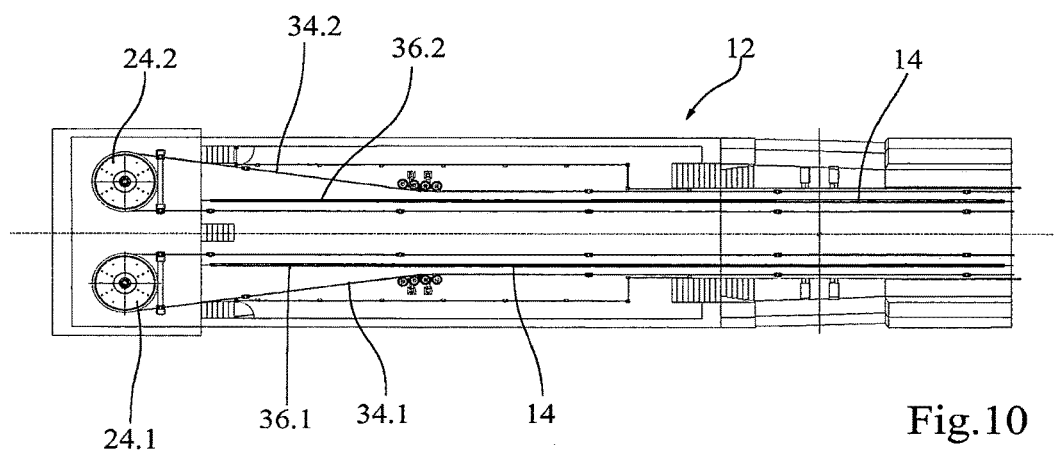
FIG. 10, a top view of the downstream station in FIG. 1.

FIGS. 9 and 10 illustrate the downstream station 12 equipped with the two pulleys 24.1, 24.2, freely rotating, turning around vertical axes. The diameters of the driving pulleys 20.1, 20.2 of the upstream station and of the idle pulleys 24.1, 24.2 of the downstream station are preferably substantially identical. As illustrated by FIGS. 2 to 10, the linking sections 34.1, 34.2, in their path along the track 14, flank the towing sections 32.1, 32.2 and the return sections 36.1, 36.2.

The symmetry of the installation is such that in theory, if the two driving pulleys 20.1, 20.2 are driven at equal speed in opposite directions and assuming the dynamic elastic deformations of the cable identical on either side, the vehicle 16 is driven in an ascending or descending direction, without the return pulleys 26, 28 rotating. In practice, the conditions for perfect symmetry are not achieved, owing for example to the differences in perimeter of the driving pulleys and rotation of the return pulleys 26, 28 allows dynamic balancing of the forces exerted on the sections of the cable 30. It may also be chosen to control the driving pulleys 20.1, 20.2 with a speed difference, so as to cause constant rotation of the return pulleys 26, 28, as discussed above. This speed difference may be constant or variable, particularly periodically.

It is also noted that the relative position of the bearings 26.1, 28.1 allows, in case of a slight lack of alignment of the vehicle in relation to the track, generation of a compensating torque on the chassis 50 of the vehicle, thereby bringing the vehicle back into alignment. The positioning of the bearings 26.1 upstream from the centre of gravity of the vehicle when empty and upstream from the platform 52 bearing the load 54 also ensures correct orientation of the vehicle on the track, both when loaded and when empty, to the extent that the centre of gravity of the vehicle 16 when empty is in the median longitudinal plane and that the load 54 is also positioned such that its centre of gravity is in the median longitudinal plane.

In the event of failure of one of the motors 22.1, 22.2, the corresponding brake 49.1, 49.2 can be operated and the vehicle 16 can be driven at low speed by the other motor.

Figure 11:
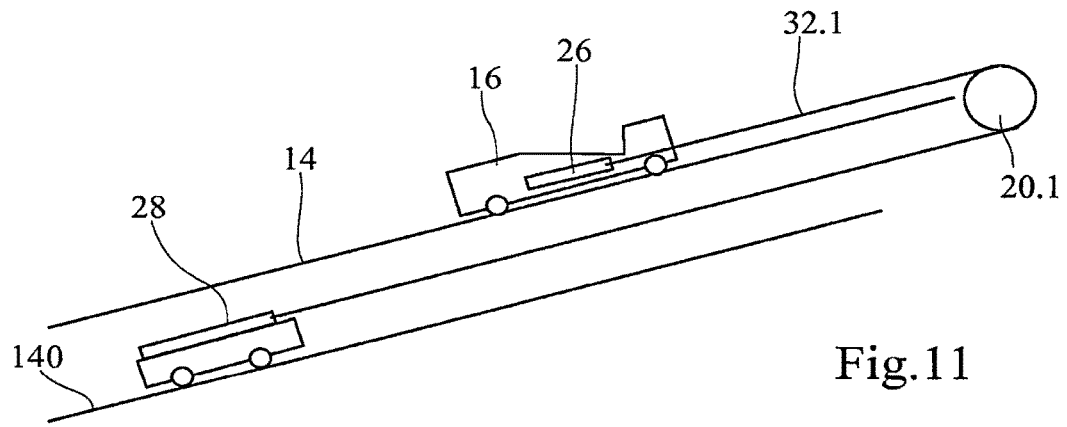
FIG. 11, a diagrammatic view of a funicular according to a second embodiment of the invention.
Figure 12:
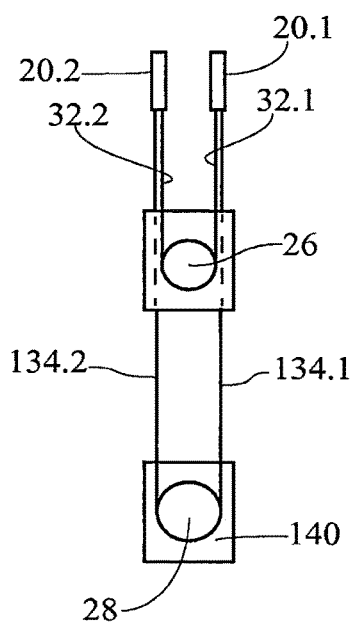
FIG. 12, another diagrammatic view of the funicular in FIG. 11.

FIGS. 11 and 12 provide a simplified and diagrammatic illustration of a second embodiment of the invention. According to this embodiment, the towing cable 30 is a closed-loop cable featuring a first towing section 32.1 between a return pulley 26 on the vehicle 16 and a first driving pulley 20.1 situated in the upstream station, a first linking section 134.1 towed between the first driving pulley 20.1 and a second return pulley 26 mounted on a counterweight 140 travelling on a counterweight track 140 parallel to the track 14 (preferably under the latter), in the opposite direction to the vehicle 16, a second linking section 134.2 towed between the counterweight pulley 124 and a second driving pulley 20.2 situated in the upstream station and a second towing section 32.2 towed between the second motor pulley 20.2 and the return pulley 22, closing the loop of the cable 30. In order to facilitate understanding of the entire funicular, the spatial positioning of the various different elements of the installation deliberately does not correspond to reality.

In order to control the funicular according to the invention in its different embodiments, it is possible to resort to different sensors in order to measure different status variables of the installation and more particularly: sensors measuring the speed or rotation of the driving pulleys 20.1, 20.2, sensors measuring the speed or rotation of the pulleys 24.1, 24.2 of the downstream station, sensors measuring the speed or rotation of the return pulleys 26, 28, extensometric sensors detecting stretching of the different sections of the cable or some thereof, sensors measuring the resulting force on the axis of the upstream return pulley 26, sensors measuring the speed of the vehicle 16 and sensors measuring the motor torque of the driving pulleys 20.1, 20.2.

Naturally, various modifications are possible. It is possible in particular to double the installation, so as to ensure redundancy in towing.

The tensioning devices are not necessary positioned on the towing sections, but may be alternatively placed on the linking sections or the return sections. The drive motors may be arranged in the downstream station. Motorisation divided between the two stations may also be contemplated.

The invention claimed is:

1. A vehicle designed to run on a railway track and comprising a chassis defining a median longitudinal vertical plane, wherein the chassis rests on at least a first pendulum running gear, comprising two independent lateral pendulum devices situated on either side of the median longitudinal vertical plane, wherein each lateral pendulum device comprises:
   a secondary pendulum articulated in relation to the chassis around a horizontal secondary pivot axis and
   two primary pendulums, each articulated in relation to the secondary pendulum around a horizontal primary pivot axis, wherein the primary pivot axes of the two primary pendulums are spaced apart from each other, longitudinally on either side of the secondary pivot axis, wherein each primary pendulum is associated with at least two support rollers designed to run on the railway track, each rotating around a rotation axis parallel to the primary pivot axis of the associated primary pendulum and situated longitudinally on either side of the primary pivot axis of the associated primary pendulum,
   a plate to which the secondary pendulum device is articulated, the plate being connected to the chassis via one or several jacks oriented perpendicularly to the secondary pivot axis the one or several jacks being capable of lifting the chassis relative to the horizontal secondary pivot axis and to the railway tracks for setting the vehicle in motion, and of lowering the chassis relative to the horizontal secondary pivot axis and to the railway track for loading or unloading phase or for emergency braking, wherein the vehicle further comprises skids fixed to the chassis, intended to bear against a braking track running alongside the railway track when the chassis is lowered.

2. The vehicle of claim 1, wherein the secondary pendulums are hinged to the chassis such that for each lateral pendulum device, the secondary pivot axis is always perpendicular to the median longitudinal vertical plane.

3. The vehicle of claim 1, wherein the primary pendulums are articulated in relation to the secondary pendulums such that for each lateral pendulum device, the primary pivot axes are always parallel to the secondary pivot axis.

4. The vehicle of claim 1, wherein for each lateral pendulum device, the plate is connected to the chassis via two jacks oriented perpendicularly to the secondary pivot axis.

5. The vehicle of claim 1, wherein the vehicle is a funicular comprising a floor defining a horizontal plane and a vertical axis and in that the jacks are oriented along an axis tilted in relation to the vertical axis and designed to be perpendicular to the track.

6. The vehicle of claim 1, wherein the vehicle is cable-drawn and comprises at least one first return pulley to guide a towing cable pulling the vehicle in a predetermined first towing direction, wherein the first return pulley rotates in at least one bearing integral with the chassis.

7. The vehicle of claim 6, wherein the vehicle has a centre of gravity when empty situated in the first towing direction at a distance from and to the rear of the bearing of the first return pulley.

8. The vehicle of claim 1, further comprising at least a second pendulum running gear, spaced apart from the first pendulum running gear, in a longitudinal direction of the vehicle, wherein the second pendulum running gear comprises two independent lateral pendulum devices situated on either side of the median longitudinal vertical plane, wherein each lateral pendulum device comprises:
- a secondary pendulum articulated in relation to the chassis around a horizontal secondary pivot axis and
- two primary pendulums, wherein each articulated in relation to the secondary pendulum around a horizontal primary pivot axis, wherein the primary pivot axes of the two primary pendulums are spaced apart from each other, longitudinally on either side of the secondary pivot axis, where in each primary pendulum is associated with at least two support rollers designed to run on the railway track, each rotating around a rotation axis parallel to the primary pivot axis of the associated primary pendulum and situated longitudinally on either side of the primary pivot axis of the associated primary pendulum,
- wherein each lateral pendulum device of the second pendulum running gear comprises a plate connected to the chassis, the plate having the secondary pendulum of the second pendulum running gear hingedly attached thereto, wherein for each lateral pendulum device of the second pendulum running gear, the plate is connected to the chassis via one or several jacks oriented perpendicularly to the secondary pivot axis of the secondary pendulum of the second pendulum running gear and capable of lifting the chassis relative horizontal secondary pivot axis of the secondary pendulum of the second pendulum running gear and relative to railway tracks for setting the vehicle in motion and lowering the chassis for loading or unloading phase or for emergency braking.

9. A vehicle of claim 8, wherein the support rollers of the first pendulum running gear and of the second pendulum running gear are not motorised.

10. A funicular comprising an upstream station, a downstream station, a railway track, connecting the upstream station to the downstream station, further comprising the vehicle according to claim 1, running on the railway track and drawn by at least one towing cable.

11. The vehicle of claim 2, wherein the primary pendulums are articulated in relation to the secondary pendulums such that for each lateral pendulum device, the primary pivot axes are always parallel to the secondary pivot axis.

12. The vehicle of claim 9, wherein each lateral pendulum device of the second pendulum running gear comprises a plate connected to the chassis, the plate having the secondary pendulum of the second pendulum running gear is hingedly attached thereto.

13. The vehicle of claim 4, wherein the two jacks are parallel.

14. The vehicle of claim 4, wherein the two jacks are arranged longitudinally on either side of the secondary pivot axis.

15. A funicular comprising an upstream station, a downstream station, a railway track connecting the upstream station to the downstream station, and a vehicle designed to run on the railway track and comprising a chassis defining a median longitudinal vertical plane, wherein the chassis rests on at least a first pendulum running gear, comprising two independent lateral pendulum devices situated on either side of the median longitudinal vertical plane, wherein each lateral pendulum device comprises:
- a secondary pendulum articulated in relation to the chassis around a horizontal secondary pivot axis and
- two primary pendulums, each articulated in relation to the secondary pendulum around a horizontal primary pivot axis, wherein the primary pivot axes of the two primary pendulums are spaced apart from each other, longitudinally on either side of the secondary pivot axis, wherein each primary pendulum is associated with at least two support rollers designed to run on the railway track, each rotating around a rotation axis parallel to the primary pivot axis of the associated primary pendulum and situated longitudinally on either side of the primary pivot axis of the associated primary pendulum,
- a plate to which the secondary pendulum device is articulated, the plate being connected to the chassis via one or several jacks oriented perpendicularly to the secondary pivot axis, the one or several jacks being capable of lifting the chassis for setting the vehicle in motion and lowering the chassis for loading or unloading phases or for emergency braking,
- wherein the vehicle comprises a floor defining a horizontal plane and a vertical axis and the one or several jacks are oriented along an axis tilted in relation to the vertical axis and perpendicular to the track.

16. The funicular of claim 15, wherein the vehicle farther comprises skids fixed to the chassis, intended to bear against a braking track running alongside the railway track when the chassis is lowered.

17. The funicular of claim 15, wherein the vehicle is drawn by at least one towing cable.

18. The funicular of claim 15, wherein for each lateral pendulum device, the plate is connected to the chassis via two jacks oriented perpendicularly to the secondary pivot axis, along an axis tilted in relation to the vertical axis and perpendicular to the track.

19. The funicular of claim 18, wherein the two jacks are arranged longitudinally on either side of the secondary pivot axis.

* * * * *